United States Patent [19]

Yamazaki et al.

[11] Patent Number: 4,695,614

[45] Date of Patent: Sep. 22, 1987

[54] PROCESS FOR PRODUCING AN OLEFIN COPOLYMER RUBBER

[75] Inventors: Yoshihide Yamazaki; Kazumi Uchimura; Satoshi Yamashita; Mikio Takeuchi, all of Yokkiachi, Japan

[73] Assignee: Japan Synthetic Rubber Co., Ltd., Tokyo, Japan

[21] Appl. No.: 850,067

[22] Filed: Apr. 7, 1986

Related U.S. Application Data

[63] Continuation of Ser. No. 702,062, Feb. 15, 1985, abandoned.

[30] Foreign Application Priority Data

Mar. 2, 1984 [JP] Japan .................................. 59-38671

[51] Int. Cl.$^4$ .................... C08F 4/68; C08F 236/20
[52] U.S. Cl. .............................. 526/142; 502/125; 502/127; 526/132; 526/143; 526/282; 526/283
[58] Field of Search .................... 526/132, 142, 143

[56] References Cited

U.S. PATENT DOCUMENTS

| | | | |
|---|---|---|---|
| 3,260,708 | 7/1966 | Natta et al. | 526/143 |
| 3,595,842 | 7/1971 | Schrogi et al. | 526/142 |
| 3,600,368 | 8/1971 | Schaum et al. | 526/144 |
| 3,880,819 | 4/1975 | Natta et al. | 526/169.2 |
| 3,953,410 | 4/1976 | Imai et al. | 526/142 |

FOREIGN PATENT DOCUMENTS

| | | | |
|---|---|---|---|
| 1445280 | 10/1968 | Fed. Rep. of Germany | 526/142 |
| 47-15694 | 5/1972 | Japan | 526/142 |

*Primary Examiner*—Edward J. Smith

*Attorney, Agent, or Firm*—Oblon, Fisher, Spivak, McClelland & Maier

[57] ABSTRACT

A process for producing an olefin copolymer rubber by slurry-polymerizing ethylene, at least one α-olefin and at least one non-conjugated diene in a poor solvent for the copolymer in the presence of a catalyst consisting of an organometallic compound (the first component) and a transition metal compound (the second component), characterized by using, an organoaluminum compound as the first component of the catalyst, and using, as the second component, a modified vanadium compound obtained by contacting a vanadium compound with at least one compound selected from the group consisting of the compounds represented by the following formulas:

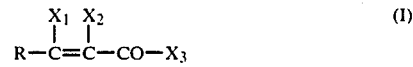

(I)

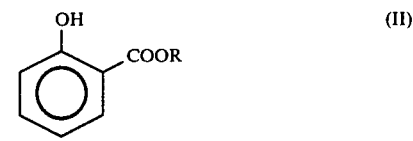

(II)

$B(OR)_3$ (III)

wherein R is a hydrocarbon group of 1 to 20 carbon atoms and $X_1$, $X_2$ and $X_3$ are independently halogen atoms or alkoxyl groups. This process can prevent a gel from being formed during polymerization.

18 Claims, No Drawings

PROCESS FOR PRODUCING AN OLEFIN COPOLYMER RUBBER

This application is a continuation of application Ser. No. 702,062, filed Feb. 15, 1985, now abandoned.

This invention relates to a process for producing an olefin copolymer rubber composed of ethylene, at least one α-olefin and at least one non-conjugated diene (hereinafter the copolymer rubber is referred to as an EPDM). More particularly, this invention relates to a process for producing an EPDM composed of ethylene, at least one α-olefin and at least one non-conjugated diene by slurry polymerization while preventing a high molecular weight polymer having a three-dimensional network (hereinafter this polymer is referred to as a gel) from being formed.

It is known to produce a sulfur-vulcanizable EPDM by copolymerization of ethylene, at least one α-olefin and at least one non-conjugated diene using a coordination complex catalyst consisting of an organoaluminum compound and a vanadium compound.

Upon copolymerizing ethylene, an α-olefin and a non-conjugated diene with such a conventionally known catalyst, a cross-linking reaction is caused between the residual double bonds of the non-conjugated diene, thereby forming a gel. This gelation is particularly remarkable in slurry polymerization wherein the polymerization is conducted in a poor solvent while depositing the resulting polymer, and it has heretofore been a great obstacle for utilization of numerous advantages of the slurry polymerization.

The gelation brings about the following disadvantages: The visco-elasticity of a polymer formed is reduced by the gelation. The cross-linked gel cannot be mixed intimately with various chemicals added to the polymer, and accordingly, when the polymer is extrusionmolded, a gel like poppy seeds appears on the surface of the molded article. These matters greatly reduce the commercial value of the polymer. Further, the gelation is especially marked in the region of a high Mooney viscosity and a high iodine value, and unless the gelation can be prevented, no polymers in this region can be produced. Therefore, the region in which polymer-production is possible becomes narrow. Furthermore, in the case of slurry polymerization, it is substantially impossible to remove the gel in a later step, and hence, it is vitally important to cause no gelation.

For prevention of the gelation, it is proposed to lower the polymerization temperature to, for example, −30° C. or −40° C. or lower; however, this is not recommendable from the standpoint of energy consumed. Further, the use of a chain transfer agent such as hydrogen, diethylzinc or the like in a large amount is considered; however, in this case, the control of the molecular weight of a polymer formed is substantially impossible.

Under such circumstances, the present inventors have conducted extensive research on the prevention of gelation in slurry polymerization. As a result, it has been found that the use of a novel catalyst obtained by modifying a conventionally known catalyst with a specific compound, there results in a meritorious effect that no gel is formed even in slurry polymerization.

According to this invention, there is provided an improved process for producing an EPDM without causing a gelation, comprising slurry-polymerizing ethylene, at least one α-olefin and at least one non-conjugated diene in a poor solvent for the EPDM in the presence of a catalyst consisting of an organometallic compound (the first component) and a transition metal compound (the second component), characterized in that the first component of the catalyst is an organoaluminum compound (A) and the second component is a modified vanadium compound obtained by contacting a vanadium compound (C) with at least one modifying compound (B) selected from the group consisting of the following three types of compounds (I), (II) and (III):

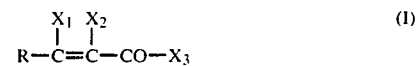

wherein R is a hydrocarbon group of 1 to 20 carbon atoms and $X_1$, and $X_2$ are independently hydrogen atoms or alkoxyl groups, and $X_3$ is halogen or alkoxy.

The α-olefin has 3 to 12 carbon atoms, and includes specifically propylene, 1-butene, 4-methylpenetene-1, hexene-1, octene-1, and the like. These may be used alone or in admixture of two or more. Of these, propylene, 1-butene and a mixture thereof are preferred.

The non-conjugated diene includes the following compounds: dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenyl)-2-norbornene, cyclooctadiene, vinylcyclohexene, 1,5,9-cyclododecatriene, 6-methyl-4,7,8,9-tetrahydroindene, 2,2-dicyclopentenyl, trans-1,2-divinylcyclobutane, 1,4-hexadiene, 2-methyl-1,4-hexadiene, 1,6-octadiene, and the like. These may be used alone or in admixture of two or more. Of these, 5-ethyldiene-2-norbornene, dicyclopentadiene and a mixture thereof are preferred.

The organoaluminum compound (A) used as the first component of the catalyst includes trialkylaluminums such as triethylaluminum, triisobutylaluminum, trioctylaluminum and the like; dialkylaluminum monohalides such as diethylaluminum monochloride, diethylaluminum monobromide, diisobutylaluminum monochloride and the like; and alkylaluminum sesquihalides such as ethylaluminum sesquichloride, ethylaluminum sesquibromide, isobutylaluminum sesquichloride, n-butylaluminum sesquibromide and the like. Of these compounds, diethylaluminum monochloride and ethylaluminum sesquichloride are particularly preferred.

The modifying compound (B) which is one of the second components of the catalyst is a compound represented by the formula:

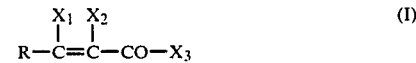

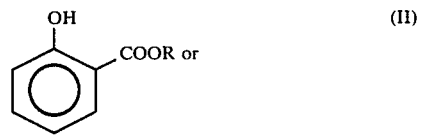

$$B(OR)_3 \quad \text{(III)}$$

wherein R, $X_1$, $X_2$ and $X_3$ have the above, and includes specifically the following compounds: unsaturated carboxylic acid derivatives belonging to the formula (I) such as cinnamyl chloride or bromide, α(or β)-chlorocinnamyl chloride or bromide, α,β-dichlorocinnamyl chloride, acrylyl chloride or bromide, α,β-dichloroacrylyl chloride or bromide, trichloroacrylyl chloride or bromide, alkyl acrylates, alkyl methacrylates, alkyl cinnamates, crotonyl chloride or bromide, methacrylyl chloride or bromide, dibutyl maleate and the like; alkyl salicylates belonging to the formula (II) such as methyl salicylate, ethyl salicylate, butyl salicylate, octyl salicylate, 2-ethylhexyl salicylate, dodecyl salicylate and the like; trialkyl borates belonging to the formula (III) such as triethyl borate, tributyl borate, trihexyl borate, trioctyl borate, tri-2-ethylhexyl borate, tridodecyl borate and the like. Of these modifying compounds, dibutyl maleate, methyl salicylate and tributyl borate are particularly preferred.

The vanadium compound (C) which is the other second component of the catalyst includes vanadium tetrachloride, vanadium oxytrichloride, vanadium triacetylacetonate, oxyvanadium diacetylacetonate, a reaction product between vanadium oxytrichloride and an alcohol, vanadyl triethoxide, vanadyl tri-n-butoxide, vanadyl di-n-butoxymonochloride, vanadyl ethoxydichloride, etc. Of these compounds, the reaction product between vanadium oxytrichloride and an alcohol, vanadium oxytrichloride and oxyvanadium diacetylacetonate are particularly preferred.

The modification of the vanadium compound with the modifying compound represented by the formula (I), (II) or (III) is conducted by contacting these compounds under appropriate conditions. For Example, a modifying agent is added to a vanadium compound placed in a solvent such as toluene or the like with stirring, and the resulting mixture is stirred for a given period of time. The contact temperature is usually −60° to 100° C., preferably −40° to 50° C., and the contact time is not critical and may be a very short time, for example, 2 to 3 sec or may be 1 week. In either case, the resulting modified compound has the same effect on the polymerization of the present invention. The amount of the modifying agent used is preferably 0.05 to 2.0 moles, preferably 0.1 to 1.0 mole, per mole of the vanadium compound.

The above modification may be conducted in the presence of the monomers to be used in the polymerization of the present invention.

Alternatively, a vanadium compound and a modifying agent may be contacted in a pipe, and then, they are continuously fed to the polymerization system.

As shown in the Examples appearing hereinafter, it is necessary in this invention to preliminarily treat a vanadium compound with a modifying agent, contact the resulting modified vanadium compound with an organoaluminum compound to form an active seed and feed the seed to the polymerization system. Only in this manner, the effect of this invention can be achieved.

The poor solvent for the copolymer used in the slurry polymerization of this invention includes, for example, propylene, 1-butene, methylene dichloride, methylene dibromide, ethyl chloride and mixtures thereof. Of these, propylene and 1-butene which are also reaction monomers are particularly preferred.

The polymerization can be conducted continuously or batchwise.

The polymerization temperature is usually −50° to 100° C., preferably −20° to 60° C.

The amount of the organoaluminum compound used is 1 to 100 moles, preferably 2 to 30 moles, per mole of the vanadium compound.

This invention will be explained more specifically below referring to Examples, however, the invention is not restricted to the Examples.

EXAMPLE 1

(1) Modification treatment

Vanadium oxytrichloride ($VOCl_3$) was modified with dibutylmaleic acid (DBM) as follows: A flask was sufficiently dried and purged with nitrogen. In this flask was placed 50 ml of toluene which has been dried with a molecular sieve and deaerated. Therein was further placed 3.4 mmols of vanadium oxytrichloride ($VOCl_3$). The resulting mixture was thoroughly stirred. Thereto was gradually added 1.7 mmols of DBM. The temperature of the mixture was kept at 10° C. with stirring, (2) Polymerization procedure A 3-liter autoclave equipped with agitating blades, a gas-introducing pipe, a thermometer, a pressure gauge, a non-conjugated diene-introducing pipe and a catalyst-introducing pipe was sufficiently purged with nitrogen, and then dried.

In this autoclave was placed 1.6 liters of dry liquid propylene. Through the gas-introducing pipe, dry ethylene and hydrogen were fed to the autoclave so that the pressure inside the autoclave was kept constant at 12.0 kg/cm² G. The amount of hydrogen fed was 1/30 mole per mole of ethylene and this proportion was kept constant.

The temperature of the autoclave was kept constant at 20° C. by an external jacket. To the autoclave was fed 10.2 g of 5-ethylidene-2-norbornene (ENB). With thoroughly stirring the contents of the autoclave, 4.5 mmols of diethylaluminum monochloride (DEAC) was added thereto. To the resulting mixture was added 0.34 mmol of the DBM-modified $VOCl_3$ obtained in (1) above to start and copolymerization.

During the polymerization, the pressure and the temperature were kept constant at 12.0 kg/cm² G and at 20° C., respectively.

After 30 min from the start of the polymerization, the supply of ethylene and hydrogen was stopped, and 100 ml of methanol was added to the polymerization system to terminate the polymerization reaction. Then, a small amount of an antioxidant was added to the reaction mixture, and thorough stirring was conducted. Thereafter, ethylene, propylene and water were removed, and steam stripping and drying were conducted. The resulting copolymer was subjected to measurement of yield, Mooney viscosity ($ML_{1+4}^{100°\ C.}$), propylene content and iodine value. The results are shown in Table 1.

(3) Measurement of gel content

About 2 g of the solid rubber obtained by drying the copolymer obtained in (2) above was weighed ($W_0$ g), and placed in a flask together with 150 ml of toluene. They were heated to reflux the toluene. One hour later, the toluene in the flask was removed by filtration through a wire net of 200 mesh (Tyler) and the insoluble polymer remaining on the wire net was dried for 24 hr under vacuum and weighed ($W_1$ g).

The gel content was calculated using the following equation:

$$\text{Gel content} = \frac{W_1}{W_0} \times 100 \text{ (wt \%)}$$

The result is shown in Table 1.

EXAMPLE 2

(1) Preparation of vanadium catalyst

A sufficiently dried flask was purged with nitrogen. Therein was placed 50 ml of toluene which had preliminarily been dried and deaerated. Further, 3.4 mmols of $VOCl_3$ was placed, and the resulting mixture was thoroughly stirred. Then, 5.1 mmols of dried n-butanol was gradually added to the mixture while bubbling the mixture with nitrogen and keeping the mixture at 30° C., whereby the resulting hydrogen chloride was removed.

The bubbling was continued for 30 min, and the preparation of catalyst was completed. (Hereinafter, the catalyst prepared under the above conditions is abbreviated to a CV catalyst.)

(2) Modification treatment

To the above CV catalyst was gradually added 1.7 mmols of dried DBM. This mixture was kept at a constant temperature of 5° C. with stirring.

(3) Polymerization procedure and measurement of gel content

Copolymerization and analysis were conducted under the same conditions as in Example 1, except that the amount of the DBM-modified CV catalyst added was 0.34 mmol in terms of $VOCl_3$.

The results are shown in Table 1.

EXAMPLE 3

(1) Modification treatment

A sufficiently dried flask was purged with nitrogen. Therein was placed 80 ml of toluene which had preliminarily been dried with a molecular sieve and deaerated. Further, 0.75 mmol of vanadium· diacetylacetonate [$VO(AcAc)_2$] was placed therein. The resulting mixture was thoroughly stirred. To the mixture was gradually added 0.38 mmol of dried DBM, and the mixture was kept at a constant temperature of 20° C. with stirring (2) Polymerization procedure and measurement of gel content Copolymerization and analysis were conducted under the same conditions as in Example 1, except that the amount of ENB added was 15.3 g and that of the amount of DBM-modified $VO(AcAc)_2$ added was 0.34 mmol.

The results are shown in Table 1.

EXAMPLE 4

(1) Modification treatment $VOCl_3$ was modified by repeating the same procedure as in Example 1, except that the modifying compound was nbutyl salicylate (BS) and the amount of BS added was 2.05 mmols.

(2) Polymerization procedure and measurement of gel content

Copolymerization and analysis were conducted under the same conditions as in Example 1.

The results are shown in Table 1.

EXAMPLE 5

(1) Modification treatment $VOCl_3$ was modified by repeating the same procedure as in Example 1, except that the modifying compound was tri-n-butyl borate (TBB) and the amount of TBB added was 2.7 mmols.

(2) Polymerization procedure and measurement of gel content

Copolymerization and analysis were conducted under the same conditions as in Example 1.

The results are shown in Table 1.

EXAMPLE 6

Modification treatment, polymerization procedure and measurement of gel content were all conducted in the same manner as in Example 2, except that, in the polymerization procedure, 16.0 g of dicyclopentadiene (DCP) was added as a non-conjugated diene, and hydrogen was fed in a proportion of 1/10 mole per mole of ethylene.

The results are shown in Table 1.

EXAMPLE 7

Modification treatment, polymerization procedure and measurement of gel content were all conducted in the same manner as in Example 1, except that the order of catalyst addition was reversed. That is, ENB was added at first and then the DBM-modified $VOCl_3$ was added, after which DEAC was added, to start copolymerization.

The results are shown in Table 1.

EXAMPLE 8

Modification treatment, polymerization procedure and measurement of gel content were all conducted in the same manner as in Example 1, except that the order of catalyst addition was reversed. That is, after ENB had been added, DEAC and the DBM-modified $VOCl_3$ were fed simultaneously from the respective pipes, to start the copolymerization.

The results are shown in Table 1.

EXAMPLE 9

In this Example, $VOCl_3$ was modified with DBM in the presence of ENB, the resulting modified catalyst was contacted with DEAC to form an active seed, and polymerization was conducted using the seed.

In the same procedure as in Example 1, ethylene, propylene and hydrogen were fed to an autoclave, whereby the pressure and the temperature inside the autoclave were kept constant at 12.0 kg/cm² G and 20° C., respectively. ENB was at first charged into the autoclave, then $VOCl_3$ and DBM were charged successively, and finally DEAC was charged, to start the copolymerization.

The amounts of ethylene, propylene, hydrogen, ENB, $VOCl_3$, DBM and DEAC added were all the same as in Example 1.

The results are shown in Table 1.

COMPARATIVE EXAMPLE 1

The same procedure and analysis as in Example 1 were conducted, except that no modifying compound was used.

The results are shown in Table 1.

COMPARATIVE EXAMPLE 2

The same procedure and analysis as in Example 2 were conducted, except that no modifying compound was used.

The results are shown in Table 1.

COMPARATIVE EXAMPLE 3

The same procedure and analysis as in Example 6 were conducted, except that no modifying compound was used.

The results are shown in Table 1.

COMPARATIVE EXAMPLE 4

DBM was used as a modifying compound as in Example 1; however, copolymerization was started without conducting a modification treatment of $VOCl_3$. That is, in the same procedure as in Example 1, ENB was fed to an autoclave; while thoroughly stirring ENB, DEAC was added thereto; then, $VOCl_3$ and DBM were charged into the autoclave simultaneously from the respective pipes to start the copolymerization. The subsequent procedure and analysis were conducted in the same manner as in Example 1.

The results are shown in Table 1.

COMPARATIVE EXAMPLE 5

As in Comparative Example 4, $VOCl_3$, and DBM were used in the copolymerization without conducting the modification of $VOCl_3$ with DBM. That is, in the same procedure as in Example 1, ENB was charged into an autoclave and then DEAC was fed. To the resulting mixture was added $VOCl_3$ to start the copolymerization. Immediately thereafter, DBM was added. The subsequent procedure and analysis were conducted in the same manner as in Example 1.

The results are shown in Table 1. In this Comparative Example, an active seed was formed at the time of $VOCl_3$ addition, whereby copolymerization proceeded. Addition of DBM in this state caused little reaction between $VOCl_3$ and DBM, and accordingly, substantially no modification was caused.

COMPARATIVE EXAMPLE 6

As in Comparative Example 4, $VOCl_3$ and DBM were used in the copolymerization without conducting the modification of $VOCl_3$ with DBM. That is, in the same procedure as in Example 1, ENB was charged into an autoclave; then DEAC, $VOCl_3$ DBM were charged simultaneously from the respective pipes; to start the copolymerization. The subsequent procedure and analysis were conducted in the same manner as in Example 1.

The results are shown in Table 1.

COMPARATIVE EXAMPLE 7

As in Comparative Example 4, $VOCl_3$ and DBM were used in the copolymerization without conducting the modification of $VOCl_3$ with DBM. That is, in the same procedure as in Example 1, ENB was charged into an autoclave; then, DBM, DEAC and $VOCl_3$ were charged in this order to start the copolymerization. The subsequent procedure and analysis were the same as in Example 1.

The results are shown in Table 1. In this Comparative Example, at the time of DEAC addition, DBM reacted with DEAC whereby the DBM required to modify $VOCl_3$ was lost and substantially no modification of $VOCl_3$ was caused.

TABLE 1

| | Non-conjugated diene | Vanadium compound | Modifying compound | Yield (g) | Mooney viscosity | Propylene content (wt %) | Iodine value | Gel content (wt %) |
|---|---|---|---|---|---|---|---|---|
| Example 1 | ENB | $VOCL_3$ | DBM | 52 | 86 | 40 | 29 | Trace |
| Example 2 | " | CV | " | 54 | 94 | 38 | 27 | " |
| Example 3 | " | $VO(AcAc)_2$ | " | 48 | 80 | 36 | 27 | " |
| Example 4 | " | $VOCl_3$ | BS | 50 | 85 | 41 | 30 | " |
| Example 5 | " | $VOCl_3$ | TBB | 50 | 90 | 35 | 29 | " |
| Example 6 | DCP | CV | DBM | 40 | 48 | 38 | 12 | " |
| Example 7 | ENB | $VOCl_3$ | " | 49 | 80 | 37 | 28 | " |
| Example 8 | " | $VOCl_3$ | " | 54 | 89 | 40 | 31 | " |
| Example 9 | " | $VOCl_3$ | " | 48 | 77 | 41 | 32 | " |
| Comparative Example 1 | ENB | $VOCl_3$ | — | 50 | 80 | 42 | 26 | 18.6 |
| Comparative Example 2 | " | CV | — | 54 | 96 | 38 | 28 | 12.7 |
| Comparative Example 3 | DCP | CV | — | 42 | 40 | 40 | 10 | 21.5 |
| Comparative Example 4 | ENB | $VOCl_3$ | DBM | 49 | 80 | 42 | 28 | 8.5 |
| Comparative Example 5 | ENB | $VOCl_3$ | " | 51 | 75 | 38 | 26 | 10.8 |
| Comparative Example 6 | " | $VOCl_3$ | " | 52 | 88 | 36 | 29 | 6.4 |
| Comparative Example 7 | " | $VOCl_3$ | " | 40 | 60 | 36 | 32 | 17.1 |

Note:
Mooney viscosity ... $ML_{1+4}^{100°C}$.
Propylene content ... Measured by an infrared spectrometer.
Iodine value ... Measured by iodometry.
Trace ... Less than 0.10% by weight.

What is claimed is

1. A process for producing an olefin copolymer rubber, which comprises:

copolymerizing ethylene, at least one α-olefin and at least one non-conjugated diene in a slurried state in a liquid-state α-olefin with substantially no solvent being present for the resulting copolymer in the presence of a catalyst consisting of an organocaluminum compound selected from the group consisting of a trialkylaluminum and a dialkylaluminum monohalide and a modified vanadium compound obtained by contacting a vanadium compound with at least one modifying salicylate compound of the formula:

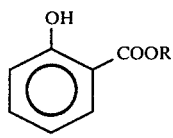

wherein R is a $C_{1-20}$ alkyl group.

2. The process according to claim 1, wherein the α-olefin has 3 to 12 carbon atoms.

3. The process according to claim 1, wherein the α-olefin is selected from the group consisting of propylene, 1-butene, 4-methylpentene-1, hexene-1 and octene-1.

4. The process acording to claim 1, wherein the α-olefin is propylene, 1-butene or a mixture thereof.

5. The process according to claim 1, wherein the non-conjugated diene is selected from the group consisting of dicyclopentadiene, tricyclopentadiene, 5-methyl-2,5-nobornadiene, 5-methylene-2-norbornene, 5-ethylidene-2-norbornene, 5-isopropylidene-2-norbornene, 5-isopropenyl-2-norborene, 5-(1-butenyl)-2-norbornene, cyclooctadiene, vinylcyclohexene, 1,5,9-cyclododecatriene, 6-methyl-4,7,8,9-tetrahydroindene, 2,2-dicyclopentenyl, trans-1,2-divinylcyclobutane, 1,4-hexadiene, 2-methyl-1,4-hexadiene and 1,6-octadiene.

6. The process according to claim 1, wherein the non-conjugated diene is 5-ethylidene-2-norbornene, dicyclopentadiene or a mixture thereof.

7. The process according to claim 1, wherein the trialkylaluminum is triethylaluminum, triisobutylaluminum or trioctylaluminum.

8. The process according to claim 1, wherein the dialkylaluminum monohalide is diethylaluminum monochloride, diethylaluminum monobromide or diisobutylaluminum monochloride.

9. The process according to claim 1, wherein the alkyl salicylate is methyl salicylate, ethyl salicylate, butyl salicylate, octyl salicylate, 2-ethylhexyl salicylate or dodecyl salicylate.

10. The process according to claim 1, wherein the vanadium compound is vanadium tetrachloride, vanadium oxytrichloride, vanadium triacetylacetonate, a reaction product between vanadium oxytrichloride and an alcohol, vanadyl triethoxide, vanadyl tri-n-butoxide, vanadyl di-n-butoxymonochloride, or vanadyl ethoxydichloride.

11. The process according to claim 1, wherein the vanadium compound is vanadium oxytrichloride or oxyvanadium diacetylacetonate.

12. The process according to claim 1, wherein the modified vandium compound is obtained by adding said modifying salicylate compound to a vanadium compound in a solvent with stirring and then subjecting the resulting mixture to stirring at −60° C. to 100° C. for a given period of time.

13. The process according to claim 12, where the amount of said modifying salicylate compound added is 0.05 to 2.0 moles per mole of the vanadium compound.

14. The process according to claim 12, wherein the modification of the vanadium compound is conducted in the presence of the monomers to be used in the polymerization reaction.

15. The process according to claim 1, wherein the copolymerization is conducted at −50° C. to 100° C.

16. The process according to claim 1, wherein the copolymerization is conducted at −20° C. to 60° C.

17. The process according to claim 1, wherein the amount of the organoaluminum compound added is 1 to 100 moles per mole of the vanadium compound.

18. The process according to claim 1, wherein said dialkylaluminum monohalide is a dialkylaluminum monochloride.

* * * * *